United States Patent [19]

Wilkinson et al.

[11] Patent Number: 4,467,467
[45] Date of Patent: Aug. 21, 1984

[54] VIDEO RECORDER-PLAYBACK MACHINE

[75] Inventors: Richard L. Wilkinson; George Vitale, both of Torrance, Calif.

[73] Assignee: Discovision Associates, Costa Mesa, Calif.

[21] Appl. No.: 492,962

[22] Filed: May 4, 1983

Related U.S. Application Data

[63] Continuation of Ser. No. 198,693, Oct. 20, 1980, abandoned.

[51] Int. Cl.³ .............................................. G11B 7/00
[52] U.S. Cl. ................................... 369/111; 369/112; 369/116; 369/106; 369/54; 346/76 L; 350/174
[58] Field of Search .............. 369/111, 112, 121, 122, 369/53, 54, 58, 106, 116; 346/76 L, 108, 109; 250/570; 350/174

[56] References Cited

U.S. PATENT DOCUMENTS

| | | | |
|---|---|---|---|
| 3,534,166 | 10/1970 | Korpel | 358/201 |
| 3,829,622 | 8/1974 | Elliott | 369/44 |
| 3,908,076 | 9/1975 | Broadbent | 369/102 |
| 3,908,080 | 9/1975 | Broadbent | 369/102 |
| 3,914,541 | 10/1975 | Eliott | 369/44 |
| 3,924,062 | 12/1975 | Broadbent | 369/102 |
| 3,944,727 | 3/1976 | Elliott | 369/44 |
| 3,947,888 | 3/1976 | Jansen | 369/111 |
| 3,977,648 | 8/1976 | Comerick | 369/111 |
| 4,005,259 | 1/1977 | Koneko | 369/122 |
| 4,051,329 | 9/1977 | Blondet | 369/116 |
| 4,145,758 | 3/1979 | Drexler | 365/200 |
| 4,152,586 | 5/1979 | Elliott | 369/45 |
| 4,225,873 | 9/1980 | Winslow | 355/342 |

FOREIGN PATENT DOCUMENTS

| | | | |
|---|---|---|---|
| 8848 | 3/1980 | European Pat. Off. | 369/111 |
| 2016747 | 9/1979 | United Kingdom | 369/111 |
| 2033132 | 5/1980 | United Kingdom | 369/111 |

OTHER PUBLICATIONS

A Review of the MCA Disco-Vision System, by Broadbent, pp. 554–559, Jul. 1974, Journal of SMPTE, vol. 83.
Abstract for Japanese Patent 119952.
"Laser Beams Make PCM Audio Disc Possible", by Nakada, JEE, Aug. 1978, pp. 50–53.
Funkschau, vol. 52, (1980), No. 6, Mar. 1980, by Siebert, "Magnavision".

*Primary Examiner*—Alan Faber
*Attorney, Agent, or Firm*—Ronald J. Clark

[57] ABSTRACT

A video recorder-playback machine is provided for recording and/or playing back video information from an information disc. The machine includes a "write" laser and a "read" laser respectively for generating record and playback optical beams which are focused upon the disc by an optical record-playback head. An optics carriage movably positions the head with respect to the disc in moving optical alignment with the "write" laser and carries the "read" laser in fixed optical alignment with the head. The machine includes apparatus for monitoring the record optical beam during operation in a record mode, and for substantially simultaneous operation in a playback mode to monitor the playback optical beam during the recording process.

48 Claims, 3 Drawing Figures

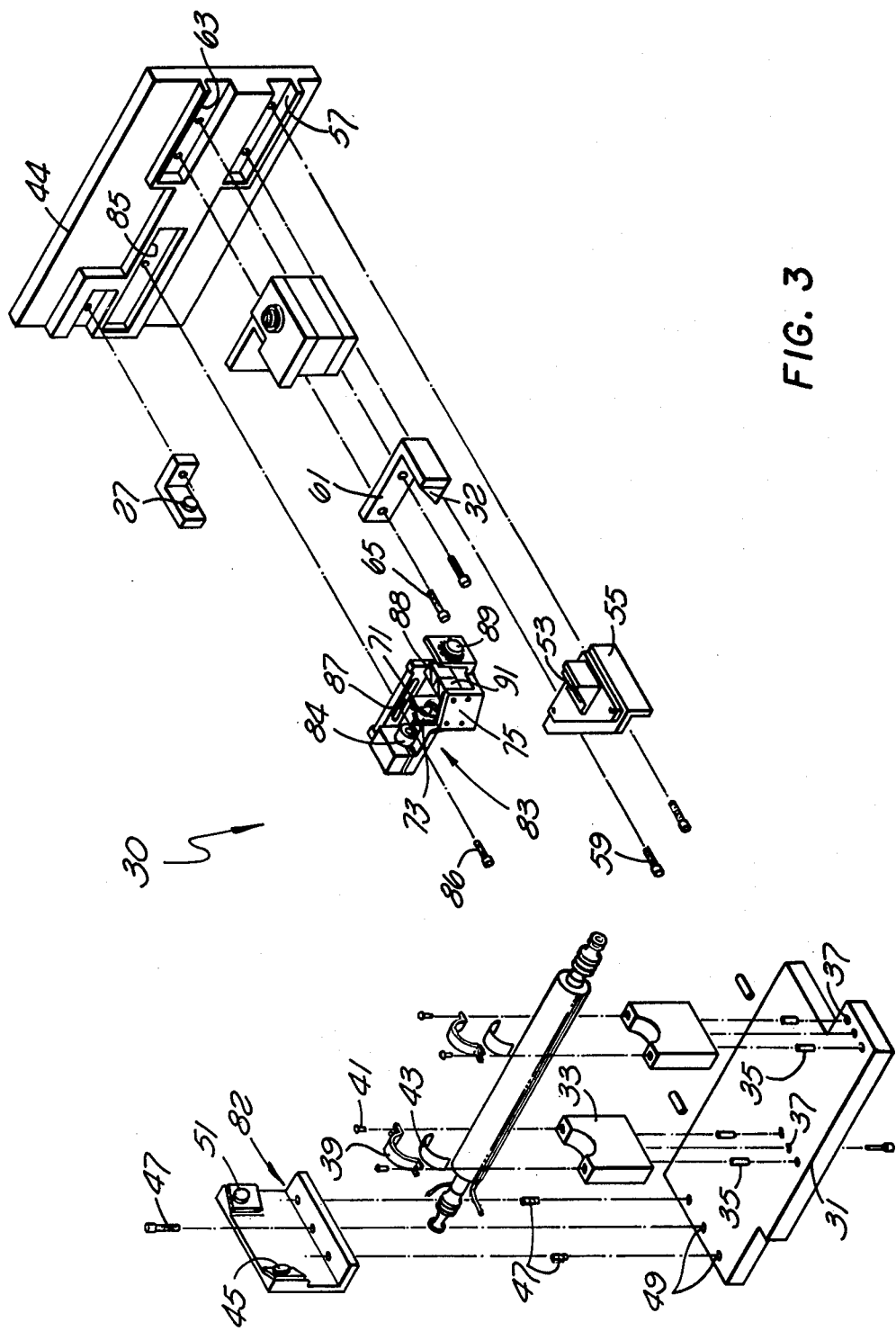

VIDEO RECORDER-PLAYBACK MACHINE

This application is a continuation of U.S. application Ser. No. 198,693, filed Oct. 20, 1980, now abandoned.

BACKGROUND OF THE INVENTION

This invention relates generally to improvements in video recorder-playback machines, and more specifically to an improved arrangement of optical components in a video recorder-playback machine of the type including optical laser beams for recording and playback of video information from a video information disc.

Video recorder-playback machines in general are known in the art and include appropriate means for recording and/or playing back a video information signal utilizing a selected medium for storage of the signal. For example, in one type of machine, the video signal is recorded magnetically for storage and/or retrieval upon a length of so-called video tape. In another type of system, the video signal is recorded upon an information disc for retrieval by means of a stylus, in a manner analogous to that of sound reproduction from phonographic records. In still another type of system, the video signal is used to frequency modulate a beam of amplified light, such as a laser beam, with sufficient power for physically altering the surface characteristics of a light sensitive coating on a video information disc and thereby record the signal upon the disc. During playback, a lower power light beam is reflected from the disc and the resulting signal is demodulated to reproduce the recorded signal. In all of these types of systems, the video information signal can be combined with an appropriate audio signal either for recording or playback purposes to yield a composite audio-video signal of the type commonly used for television transmissions and the like. For convenience, however, the signal will be referred to herein as a video information signal.

Video recorder-playback machines utilizing amplified light beams for recording and playback purposes offer significant advantages in that all physical contact of the recording and playback elements with the storage medium, namely, the information disc, is avoided. This prevents wear and deterioration of the machine elements and the disc, resulting in a high quality stored video signal which can be played back repeatably over a long period of time with unimpaired video resolution.

In video recorder-playback machines using amplified light beams for signal recording and playback, separate laser generator units are provided for generating the high power record optical beam and the low power playback optical beam, respectively. These laser generator units thus comprise a "write" laser and a "read" laser and are mounted on the machine in optical alignment with an optical record-playback head including a focusing lens for focusing the beams upon the video information disc. Typically, the record-playback head is driven in a radial direction with respect to the disc simultaneously with rotation of the disc whereby the video information is recorded upon and played back from a spiral pattern of information tracks on the disc. Importantly, for maximum information storage together with maximum recording and playback time for each disc, it is desirable to form the information tracks to have a narrow width such as on the order of about 0.5 microns, and a narrow center-to-center radial spacing such as on the order of about 1.5 microns. Accordingly, a precise optical alignment between the laser generator units and the record-playback head is critical for proper focusing of the record and playback beams to a spot image within the information tracks in order to maximize signal resolution and minimize cross talk between tracks.

In the prior art, the "write" laser and the "read" laser are commonly mounted upon a fixed base of the recorder-playback machine. A plurality of redirecting mirrors and optical conditioning lenses are provided for aligning the generated record and playback optical beams with the movable record-playback head. See, for example, U.S. Pat. Nos. 3,908,076; 3,908,080; and 3,924,062 and copending U.S. application Ser. No. 094,108, filed Nov. 14, 1979. However, these systems require a relatively large number of mirrors, etc. which must be adjusted manually to the proper position for achieving the necessary precise alignment of the beams with the record-playback head. This results in a system which is relatively complex, bulky, expensive, and difficult to maintain in proper adjustment. Accordingly, such systems have not found commercial acceptance in production quantities.

A few prior art playback machines have been proposed wherein the relatively small "read" laser is mounted in fixed optical alignment with a playback head for movement together upon an optics carriage. See, for example, U.S. Pat. Nos. 3,829,622; 3,914,541; 3,944,727; and 3,947,888. While these types of arrangements advantageously simplify alignment of the playback optical beam with the head, such arrangements heretofore have been limited for use only in playback machines. Alternately stated, these arrangements have not been adapted for use in a recorder-playback machine wherein additional alignment of the record-playback head with a record beam generated by a "write" laser is also required.

The present invention comprises an improvement upon the prior art by providing a simplified and relatively compact mounting and alignment arrangement between the "write" and "read" lasers with an optical record-playback head in a video recorder-playback machine.

SUMMARY OF THE INVENTION

A video recorder-playback machine includes a relatively high power laser generator unit or "write" laser, and a relatively low power laser generator unit, or "read" laser, for generating record and playback optical signal beams, respectively. The "write" and "read" lasers each are mounted in optical alignment with an optical record-playback head including a focusing lens for focusing the generated optical beams to a precise spot image upon a video information disc. The head is translated radially with respect to the disc simultaneously with disc rotation for recording and playback of video information from a spiral pattern of closely spaced tracks on the disc.

According to the invention, the optical record-playback head is mounted for controlled translation with respect to the disc upon an optics carriage movable linearly along a radius of the disc in a plane generally parallel to the disc. The "write" laser is mounted upon a base for the machine in a fixed position with respect to the optics carriage. At least two redirecting mirrors mounted on the machine base are provided for redirecting the record optical beam along a path in parallel with the direction of movement of the optics carriage. A dichroic mirror is angularly positioned on the carriage for redirecting the record optical beam through the record-playback head which focuses the beam upon the disc.

The "read" laser is mounted upon the optics carriage for movement with the record-playback head. Suitable redirecting mirrors redirect the playback optical beam for incidence upon an angularly disposed reflection mirror on the optics carriage, and this reflection mirror redirects the playback beam through the dichroic mirror and further through the record-playback head which focuses the beam upon the disc.

The optics carriage comprises a relatively compact subassembly including means for accurately positioning and maintaining the components mounted thereon in precise optical alignment with the record-playback head. With this construction, the optics carriage is quickly and easily assembled with the various components in correct optical alignment with each other. Upon installation in the machine, the record optical beam generated by the "write" laser is quickly and easily aligned with the optics carriage to provide a simplified mounting and alignment arrangement enabling operation of the machine in a record mode and/or a playback mode. If desired, means can be provided for accurately positioning and maintaining the "write" laser and its associated redirecting mirrors upon the machine base in various optical beams can be avoided.

In a preferred embodiment of the invention, the "read" laser is secured in optical alignment with the record-playback head for focusing of the playback optical beam upon the disc at a point slightly downstream of the point of focus of the record optical beam upon the disc. This enables the machine to be operated simultaneously in both the record and playback modes whereby the resolution of the video information being recorded can be monitored continuously as recording progresses.

The "write" laser generates an amplified continuous beam of collimated light which is passed through a modulator such as an acousto-optic modulator for frequency modulation to diffract the light beam into a modulated optical signal beam comprising the record optical beam, and a complementary optical beam diffracted angularly out of optical alignment with the record-playback head on the optics carriage. This complementary optical signal can form the input to a light responsive detection device for driving an electronic demodulator which reconverts the complementary optical beam to an electrical signal representative of the video information. Since this electrical signal is derived from the complement of the record optical beam, monitoring of this electrical signal reveals the quality of the record optical beam as recording progresses. If desired, this complementary signal can be compared with the video information played back from the disc to provide an accurate indication of recording quality during the recording process.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is an enlarged exploded perspective view of a portion of the machine illustrating the optics carriage and assembly thereof.

DETAILED DESCRIPTION OF THE PREFERRED EMBODIMENT

Figure 1:
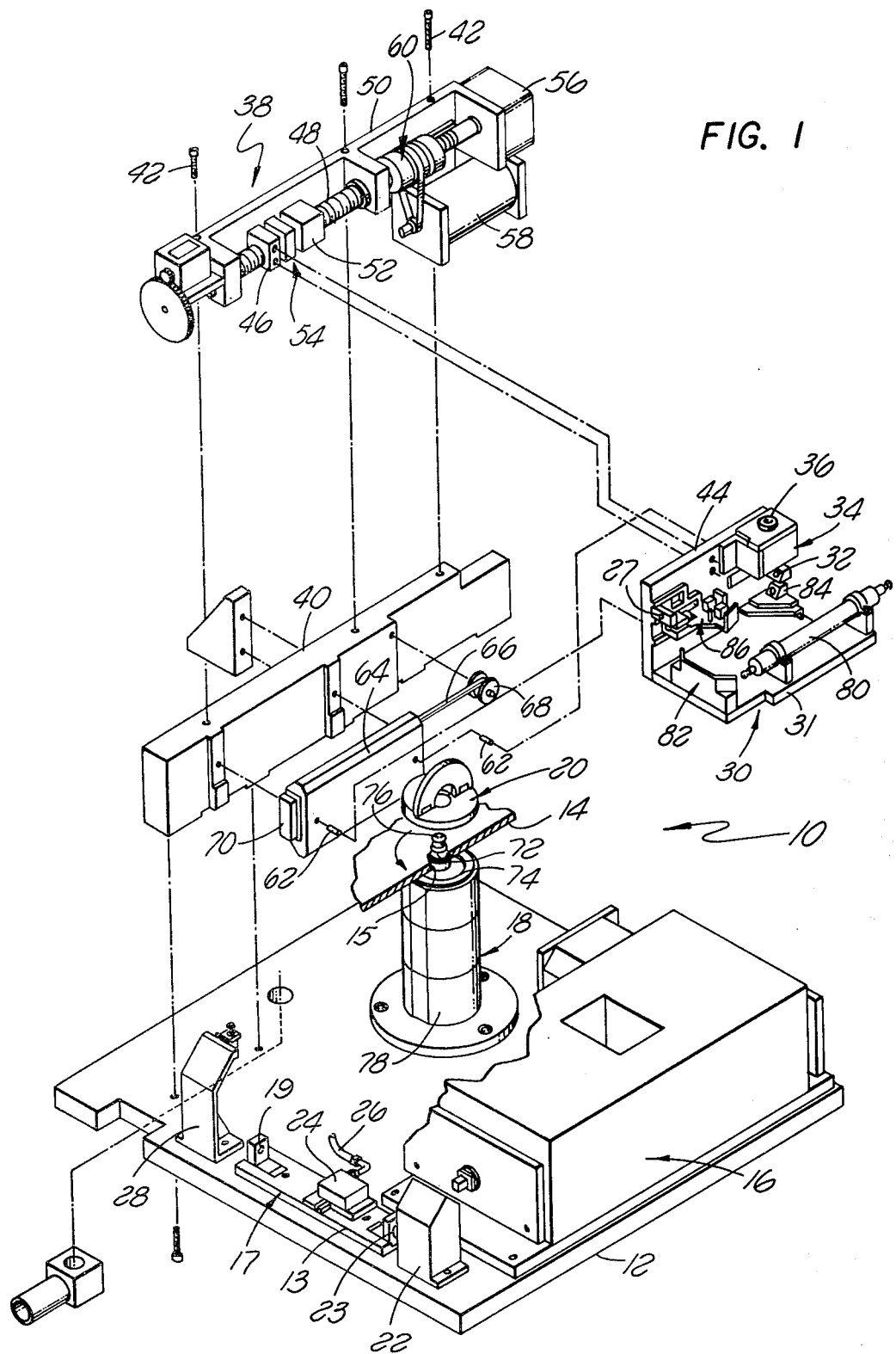
FIG. 1 is a fragmented perspective view illustrating, partially in exploded form, a video recorder-playback machine.

As shown in the exemplary drawings, the present invention is embodied in a video recorder-playback machine 10 utilizing laser-generated record and playback optical beams for recording and playback of video information from a video information disc 14. The information disc 14 is removably supported within the machine upon a spindle assembly 18 for controlled rotation of the disc at a relatively high speed during the recording and playback operations. Concurrently with disc rotation, the record and/or playback optical beams are precisely focused upon the disc 14 by an optical record-playback head 34 mounted on a mobile optics carriage 30 driven for movement in a radial direction with respect to the disc. A clamp assembly 20 cooperates with the spindle assembly 18 to clamp the disc 14 in a precisely centered position for accurate, high speed disc rotation without substantial radial eccentricities or rotational slippage.

The record-playback machine 10 of this invention comprises an iprovement over the prior art in that a simplified arrangement is provided for precise alignment of the record and playback optical beams with respect to the record-playback head 34. The machine 10 is designed for quick and easy assembly of the optical components with the record and playback optical beams in the desired alignment without requiring significant or complicated adjustments. Moreover, the alignment arrangement is relatively compact in size and is uniquely adapted for simultaneously operation of the machine in both a record mode and a playback mode to allow monitoring of the recorded information during the recording process. In addition, the machine is adapted to provide an auxiliary record optical beam for use in monitoring the quality of the record beam during the recording process, and, if desired, for use in comparing the record beam quality with the resolution of the information as recorded.

Figure 2:
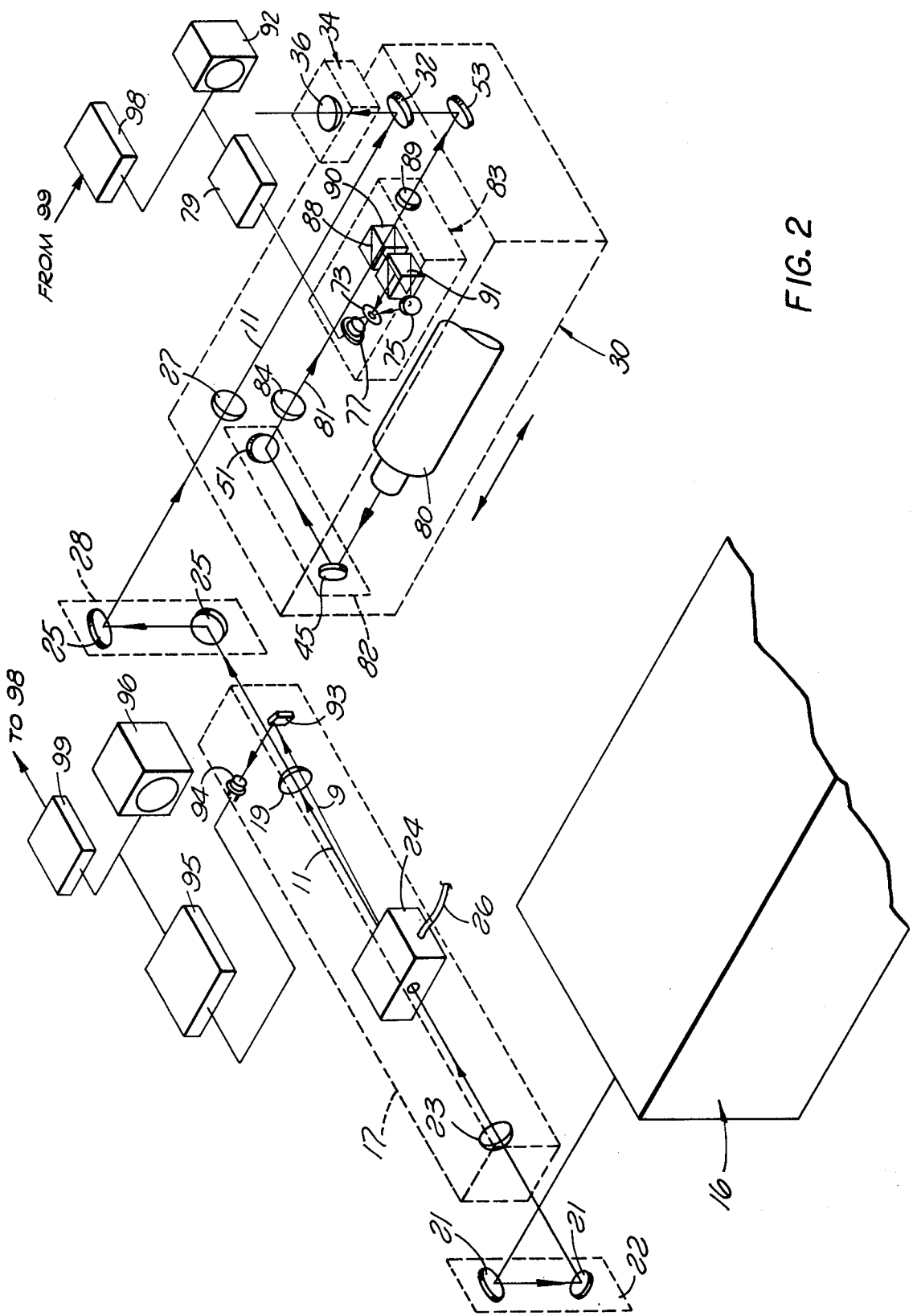
FIG. 2 is a schematic diagram illustrating the arrangement of optical components in the machine.

As shown in FIGS. 1 and 2, the video recorder-playback machine 10 includes a machine base 12 which provides support for a relatively high power laser generator unit 16, or "write" laser, such as an argon ion laser for use in recording prescribed video information upon the disc 14. The "write" laser 16 emits a highly amplified collimated beam of light which is incident upon a pair of angularly disposed mirrors 21 of a mirror mount assembly 22 secured to the machine base 12. These two mirrors 21 redirect the amplified light beam to a modulator subassembly 17 for appropriately interrupting the amplified light beam to yield a record optical beam representative of the desired video information.

The modulator subassembly 17 comprises a plate 13 suitably secured to the machine base 12 and carrying an electronically driven modulator 24, such as an acousto-optic modulator. The modulator 24 is aligned for passage of the amplified light beam reflected by the mirrors 21, with a condensing lens 23 mounted on the subassembly plate 13 being positioned between the modulator 24 and the mirrors 21 to focus the light beam for passage through the modulator.

The modulator 24 is driven by a suitable frequency modulated electronic signal supplied via an input lead 26 wherein the electronic signal is representative of the desired video information. The modulator 24 responds to the electronic signal to diffract a portion of the amplified beam of light as illustrated by the arrow 9 in FIG. 2, and thereby pass without diffraction a corresponding modulated record optical beam as illustrated by the arrow 11 in FIG. 2. This resultant record optical beam 11 is therefore representative of the prescribed video information, and the diffracted beam 9 comprises the modulated complement of the record optical beam and is thus also representative of the prescribed video information. Conveniently, in many instances, the electronic signal comprises a composite audio-video signal of the type commonly used in television transmissions and which, when supplied to the modulator 24, yields an optical signal beam representative of the composite audio and video information. However, for sake of clarity and ease of description, all further reference herein will be to video information.

The modulated record optical beam from the modulator 24 passes through a second condensing lens 19, which is also carried by the subassembly plate 13, for incidence upon a pair of mirrors 25 of a second mirror mount assembly 28 secured to the machine base 12. These latter mirrors 25 function to reflect the modulated second optical beam 11 to the mobile optics carriage 30 for further reflection and focusing of the beam by the optical record-playback head 34 to the surface of the video information disc 14. More specifically, the optics carriage 30 carries an additional condensing lens 27 which focuses the record optical beam upon a dichroic mirror 32 which is mounted on the carriage 30 in an angularly disposed position for reflection of the beam 11 in an upward direction through the record-playback head 34.

The record-playback head 34 carries a focusing lens 36 for focusing the record optical beam 11 to a precise spot image on the underside of the video information disc 14. In this regard, the record-playback head 34 includes means responsive to the distance between the focusing lens 36 and the disc 14 for maintaining the focusing lens 36 at a prescribed distance from the disc, and thereby maintain a precise focus of the record optical beam upon the disc. For a more detailed description of the record-playback head 34 together with adjustment of the focusing lens position, see concurrently filed and copending U.S. application Ser. No. 198,697, now U.S. Pat. No. 4,422,169, entitled LENS ASSEMBLY FOR A VIDEO RECORDER-PLAYBACK MACHINE, which is incorporated by reference herein.

The optics carriage 30 is movably positioned by a carriage drive assembly 38 along a linear path in a radial direction with respect to the disc 14. In this manner, the focusing lens 36 of the record-playback head 34 is movably positioned with respect to the disc 14 along a radius of the disc to control the point of focusing of the record optical beam upon the disc. As illustrated, the carriage drive assembly 38 comprises a precision lead screw 48 supported for rotation by a bracket 50 which can be secured to a frame 40 and to the machine base 12 by a plurality of bolts 42. The lead screw 48 threadably receives a lead screw nut 52 coupled via a nonrotational coupling indicated at 54 to a sleeve-type push block 46 positioned freely about the lead screw 48 and secured to an upright wall 44 of the optics carriage 30.

The lead screw 48 is oriented in a direction generally parallel with the required radial direction of movement of the optics carriage 30. A relatively slow speed reversible motor 56 and a relatively high speed reversible motor 58 are connected to the lead screw 48 through a selective clutch unit 60, and this clutch unit is operated to control driving of the lead screw 48 about its own axis either at a relatively slow or relatively fast speed of rotation.

As illustrated in FIG. 1, the optics carriage 30 is driven by the lead screw 48 in a radially outward direction with respect to the disc 14 whenever the lead screw 48 is rotated to cause the lead screw nut 52 to push against the push block 46. When the lead screw is rotated in an opposite direction, the lead screw nut 52 travels along the screw in an opposite direction. To assure that the optics carriage 30 follows in the opposite, or radially inwardly direction with respect to the disc 14, the carriage 30 is secured by pins 62 to a linear track member 64 which is urged with respect to the disc 14 in the radially inward direction by a constant tension band spring 66 wound about a barrel 68 secured to the frame 40. The track member 64 is slidably mounted on a track guide 70 secured to the frame 40 and shaped to accommodate linear movement of the optics carriage 30 in both the radially inward and the radially outward directions.

For a more detailed description of the carriage drive assembly 38, see concurrently filed and copending U.S. application Ser. No. 198,696, now U.S. entitled DRIVE ASSEMBLY FOR A VIDEO RECORDER-PLAYBACK MACHINE, which is incorporated by reference herein.

The video information disc 14 is rotatably driven about a vertical axis by the spindle assembly 18 simultaneously with linear movement of the optics carriage 30. More specifically the disc 14 is vertically supported upon a rotatable drive spindle 72 including an upwardly extending annular shoulder 74 for supporting the disc, and an upper shaft portion 76 received through a central opening 15 formed in the disc. The drive spindle 72 is carried within an upright spindle housing 78 which is secured to the machine base 12 and supports the spindle 72 for relatively high speed rotation, such as on the order of about 1800 rpm, about its vertical axis. A drive motor (not shown) is drivingly coupled to the spindle 72 for rotating the spindle at the relatively high speed of rotation. The clamp assembly 20 is receivable over the upper shaft portion 76 of the spindle 72 for locking the disc in a precisely centered position for high speed rotation.

Further details of a preferred specific construction for the spindle assembly 18 are set forth in concurrently filed and copending U.S. application Ser. No. 198,695, now U.S. Pat. No. 4,339,814, entitled SPINDLE ASSEMBLY FOR A VIDEO RECORDER-PLAYBACK MACHINE, and further details of the construction of the clamp assembly 20 are described in concurrently filed and copending U.S. application Ser. No. 198,694, now U.S. Pat. No. 4,347,599, entitled CLAMP ASSEMBLY FOR A VIDEO RECORDER-PLAYBACK MACHINE, both of which are incorporated by reference herein.

In operation, the record optical beam is focused upon the underside of the video information disc 14 by the radially traversing focusing lens 36 on the optics carriage 30 simultaneously with high speed rotation of the disc. By appropriately controlling the relationship between radial traversal and rotational speed, the record optical beam is focused upon the disc along a spiraling pattern of closely spaced tracks. Importantly, the disc 14 includes a photosensitive coating, such as a layer of thin metal or a photoresist material, adapted to be physically altered by the high power record optical beam whereby the optical beam is physically recorded upon the disc as a pattern of discontinuities representative of the prescribed video information. In practice, the closely spaced tracks have a width on the order of about 0.5 microns and a center-to-center spacing of about 1.5 microns.

The high power record optical beam is quickly and easily aligned optically with the record-playback head 34 with little or no adjustment of the optical components. More specifically, the track member 64 constrains the optics carriage 30 for movement along a precise linear path, and this path can be predetermined in direction and location with respect to the machine base 12 by appropriate sizing and positioning of the drive assembly 38 upon the frame 40 with respect to the base 12. The mirror mount assemblies 22 and 28 of the machine base 12 function to redirect the high power record optical beam first through the modulator 24 and then along this precise linear path for incidence upon the angularly disposed dichroic mirror 32, regardless of the radial position of the optics carriage 30. Conveniently, the "write" laser 16 together with the mirror mount assemblies 22 and 28 and the modulator subassembly 17 can be mounted on the base 12 in precise, predetermined locations by means of pre-formed mounting holes or the like in the base so that the record optical beam is appropriately and automatically aligned optically with the record-playback head 34 upon installation of the components on the machine base 12. If additional adjustment of the direction of the record optical beam is desired, one or both of the mirror mount assemblies 22 and 28 can be formed to include adjustable mirrors to allow precise and rapid adjustment of the record optical beam for incidence upon dichroic mirror 32 of the mobile optics carriage 30.

As illustrated in FIGS. 1 and 2, a relatively low power laser generator unit 80, or "read" laser such as a helium-neon laser is provided for generating a playback optical beam for use in retrieving or playing back the recorded video information for the disc 14. This "read" laser 80 emits an amplified and collimated optical beam of light having a frequency different from the record optical beam for reflection off the disc 14 whereby the reflected beam comprises a modulated playback beam which is alternately reflected and non-reflected in accordance with the recorded video information. This modulated playback beam is of sufficiently low power to avoid physical alteration of the photosensitive coating on the disc 14.

The "read" laser 80 is mounted directly upon the optics carriage 30 for movement with the record-playback head 34. In this manner, the "read" laser 80 is mounted in a fixed position with respect to the head 34 to eliminate substantially adjustment or optical alignment with the head 34. Importantly, however, the optics carriage 30 comprises a compact subassembly for the machine adapted to carry the "read" laser 80 without interfering with the "write" laser 16 and the record optical beam generated thereby.

More specifically, as shown in detail in FIG. 3, the optics carriage 30 comprises a relatively small horizontal platform 31 upon which are mounted a pair of upwardly concave support brackets 33 by means of a plurality of pins 35 received into prepositioned locator holes 37 in the platform 31. Curved retainer straps 39 in turn are received over the "read" laser 80 and are secured by screws 41 to the brackets 33 to mount the "read" laser 80 upon the brackets 33. If desired, cushion strips 43 of a felt material or the like are interposed between the straps 39 and the laser 80 to prevent movement of the laser 80 within the brackets 33 as a result of vibrations or the like. Accordingly, the "read" laser 80 is securely and accurately positioned upon the optics carriage 30.

A relatively small mirror mount assembly 82 is secured in close association with the "read" laser 80 by pins 47 received into pre-formed locator holes 49 in the platform 31. This mirror mount assembly 82 includes a first mirror 45 and a second mirror 51 accurately positioned for reflection of the light beam emitted by the "read" laser along a path in parallel with the direction of movement of the optics carriage 30, as illustrated by the beam 81 in FIG. 2. Accordingly, the light beam 81 from the "read" laser 80 is reflected along a path in parallel with the record optical beam 11 generated by the "write" laser 16, with the record optical beam 11 being spaced above the beam 81 from the "read" laser 80 as shown in FIG. 2.

A focusing subassembly 83 is secured to the upright wall 44 of the optics carriage 30, and includes a condensing lens 84 positioned along the path of the light beam 81 from the "read" laser 80. As illustrated in FIG. 3, focusing subassembly 83 is sized for reception into a complementary shaped recess 85 in the carriage wall 44, and a screw 86 is provided for securing the subassembly 83 within the recess 85. Conveniently, however, this screw 86 is received through an elongated slot 87 formed in the subassembly 83 whereby the precise position of the subassembly 83 within the recess 85 is adjustable within the limits provided by the slot 87.

The condensing lens 84 of the focusing subassembly 83 focuses the light beam 81 from the "read" laser 80 for passage through a polarizing beam splitter cube 88 and further through a quarterwave plate 89, both of which are mounted in fixed positions upon the subassembly 83. The beam 81 passes further to an angularly disposed reflection mirror 53 for reflection of the beam 81 upwardly through the dichroic mirror 32 and further to the record-playback head 34. Importantly, the reflection mirror 53 is carried by a bracket 55 secured to the carriage wall 44 within a recess 57 by screws 59, and the dichroic mirror is carried by another bracket 61 in a position directly above the reflection mirror 53 and secured to the carriage wall 44 within a recess 63 by screws 65. Accordingly, the dichroic mirror 32 is positioned for reflection of the record optical beam 11 in an upward direction to the record-playback head 34, and for simultaneous passage of the beam 81 from the "read" laser 80 in an upward direction to the record-playback head 34.

The "read" laser beam 81 is thus formed upon the video information disc 14 by the record-playback head 34, and this beam 81 is reflected and nonreflected from the surface of the disc 14 according to the surface configuration of the disc. The reflected portion of the light beam 81 comprises a modulated optical playback beam which is reflected downwardly back through the dichroic mirror 32 to the reflection mirror 53. The reflection mirror 53 in turn reflects the playback optical beam back through the quarterwave plate 89 which functions to prevent passage of light of other frequencies, such as the frequency of the record optical beam, and which allows free passage of the playback optical beam to the polarizing beam splitter cube 88.

The polarizing beam splitter cube 88 includes a mirrored back surface 90 for redirecting the returning playback optical beam in a transverse direction to a 50–50 beam splitter cube 91 mounted on the focusing subassembly 83 alongside the polarizing cube 88. This 50–50 beam splitter cube 91 reflects one portion of the playback optical beam to an aperture 71 in a plate 73, and another portion of the beam is directed to a small redirecting mirror 75 on the focusing subassembly. The redirecting mirror 75 is angularly positioned to reflect the incident portion of the beam toward the aperture 71, but at an angle with respect to the first portion of the beam. A photodetector 77, such as a light sensitive diode, is positioned behind the aperture 71, and responds to the incident light to generate an electrical signal representative of the prescribed video information carried by the playback optical beam. This electrical signal can be supplied to an appropriate frequency modulation discriminator 79 for reprocessing and demodulation to yield an electrical signal for supply to an appripriate video display device 92, such as a television receiver, for playback of the recorded video information. Conveniently, the photodetector 77 and can also be used to determine and to provide an electrical signal for the adjustment of the position of the focusing lens 36 of the record-playback head 34 with respect to the disc 14, as is discussed in detail by way of example in U.S. Pat. No. 4,152,586.

The various optical components on the optics carriage 30 are precisely arranged for focusing the beam 81 from the "read" laser 80 upon the disc 14 without substantial alignment adjustments. That is, the components are secured in position upon the carriage 30 and with respect to each other for proper alignment upon assembly. Moreover, the components are positioned for proper operation and optical alignment with the record optical beam 11 without any interference between the record and playback optical beams.

The reflection mirror 53 is carried by the bracket 55 for reflection of the "read" laser beam 81 at a slight angle with respect to the record optical beam. This angle is chosen so that the beam 81 is focused upon the disc 14 slightly downstream, say about a few microns, of the focal point of the record optical beam 11. Thus, the two beams are not focused upon precisely the same spot on the disc 14, whereby the machine can be operated in both the record and playback modes at the same time to provide a substantially simultaneous playback of the recorded information. This allows the resolution of the recorded information to be monitored during the recording process. This is particularly advantageous when the machine is operated to produce a "master" disc 14 for use in the large scale manufacture of production disc replicas in that the simultaneous playback of the recorded information provides an immediate indication of the quality of the recording.

As illustrated in FIG. 2, the machine also includes means for monitoring the quality of the record optical beam during the recording process. More specifically, the diffracted beam 9 from the modulator 24 comprises the complement of the record optical beam 11, and this complement or auxiliary beam 9 can be directed by a mirror 93 to a photodetection device 94, such as a light sensitive diode. This photodetection device 94 generates an electrical signal representative of the video information in generally the same manner as the photodetector 77 on the optics carriage 30, resulting in an electronic signal for connection as the input to an appropriate frequency modulator discriminator 95. The discriminator 95 demodulates the signal to yield an appropriate electrical information signal suitable for supply to a display device 96 such as a television receiver and thereby allow monitoring of the quality of the record optical beam during the recording process.

The monitored record signal and the monitored playback signal can be compared during the recording process to provide an accurate indication of the quality of the video recording on the disc 14. This comparison is made by a comparator 98 coupled to the outputs of the demodulators 79 and 95, with an appropriate time delay device 99 introduced into the circuit to delay slightly the output from the demodulator 95 and thereby account for the slight downstream focusing of the beam 81 from the "read" laser 80 upon the disc 14. This comparison is also particularly useful in applications where the machine is used for making master information discs which are then used in the subsequent replication of discs in production quantities. A comparison of the qualities of the signals allows close monitoring of the various video signals whereby substantial imperfections can be detected and the recording process restarted with a new disc without having to complete the recording process before the recorded signal is checked.

A variety of modifications and improvements to the video recorder-playback machine of this invention are believed to be apparent to one skilled in the art. Accordingly, no limitation on the invention is intended, except as set forth in the appended claims.

What is claimed is:

1. A recorder-playback machine for recording and/or playing back information from an information storage disc, comprising:
   a machine base;
   a "write" laser secured to said machine base, said "write" laser operative to generate a first light beam directed along a first path for use in recording information upon the disc;
   means for supporting the disc for rotation relative to said machine base;
   an optics carriage movably mounted with respect to said machine base;
   an optical record-playback head mounted on said carriage for movement therewith;
   a "read" laser mounted on said carriage for movement therewith, said "read" laser operative to generate a second light beam directed along a second path in fixed optical alignment with said head for passage of said second light beam through said head and for focusing thereof by said head upon the disc for use in playing back information from the disc;
   means for moving said carriage with respect to said machine base and said disc generally in parallel with a portion of said first path;
   modulator means mounted on said machine base along said first path for interrupting said first light beam to produce a modulated light beam representative of the information to be recorded;

a first condensing lens for focusing said first light beam for passage through said modulator means, and a second condensing lens for directing said modulated light beam along a length of said first path to said carriage, said first path length including said first path portion; and means on said carriage in optical alignment with said first light beam for reflecting said first light beam through said head regardless of the position of said carriage for focusing of said first light beam by said head upon the disc.

2. A recorder-playback machine as set forth in claim 1, wherein said modulator means comprises an acousto-optic modulator.

3. A recorder-playback machine as set forth in claim 1, wherein said first and sand said modulator means are mounted in fixed relation to each other on a subassembly plate, and wherein said subassembly plate is mounted in a fixed position with respect to said "write" laser upon said machine base.

4. A recorder-playback machine as set forth in claim 1, including a first mirror mount assembly for redirecting said first light beam to said modulator means, and a second mirror mount assembly for redirecting said modulated light beam from said modulator means along said first path.

5. A recorder-playback machine as set forth in claim 4, wherein said first and second mirror mount assemblies are mounted on said machine base in fixed relation thereto.

6. A recorder-playback machine as set forth in claim 1, including track means for mounting said carriage upon said machine base for movement of said carriage generally along a linear path corresponding substantially with a radius of the disc when the disc is supported upon said support means.

7. A recorder-playback machine as set forth in claim 1, wherein said record-playback head includes an objective focusing lens for passage of said first and second light beams and for focusing thereof upon the disc.

8. A recorder-playback machine as set forth in claim 1, wherein said "read" laser is mounted on said carriage for generating and directing said second light beam along a portion of said second path substantially in parallel with said first path portion.

9. A recorder-playback machine as set forth in claim 8, including mirror means mounted on said carriage for reflecting said second light beam along said second path.

10. A recorder-playback machine as set forth in claim 8, wherein said means for reflecting said first light beam through said head comprises a dichroic mirror oriented for reflection of said first light beam through said head, and including a reflection mirror mounted on said carriage adjacent to said dichroic mirror for reflecting said second light beam through said dichroic mirror and further through said head, said dichroic mirror being oriented to allow passage of said second light beam.

11. A recorder-playback machine as set forth in claim 10, wherein said reflection mirror is oriented to reflect said second light beam through said head for focusing of said second light beam by said head upon the disc at a point slightly downstream from the point of focus of said first light beam.

12. A recorder-playback machine as set forth in claim 11, wherein said modulator means comprises means for splitting said first light beam into said modulated light beam for passage along said first path, and an auxiliary light beam comprising the complement of said modulated light beam and directed along a third path, and including light responsive means along said third path for generating an electrical signal in response to said auxiliary light beam for use in monitoring the characteristics of said modulated light beam.

13. A recorder-playback machine as set forth in claim 12, including means along said second path for responding to any portion of said second light beam reflected from the disc along said second path for generating an electrical signal in response to said reflected portion for use in playing back the information from the disc.

14. A recorder-playback machine as set forth in claim 13, including comparator means for comparing the electrical signal generated by said light responsive means along said third path with the electrical signal generated by said light responsive means along said second path.

15. A recorder-playback machine as set forth in claim 10, including a focusing subassembly mounted on said carriage for movement therewith, said subassembly including a first lens along said first path for conditioning said first light beam for passage through said head, and a second lens along said second path for conditioning said second light beam for passage through said head.

16. A recorder-playback machine as set forth in claim 15, wherein said focusing subassembly further includes means along said second path for passing said second light beam in a direction toward the disc, and for reflecting in a generally lateral direction light reflected from the disc along said second path in a direction away from the disc.

17. A recorder-playback machine as set forth in claim 16, including light sensitive means mounted on said focusing subassembly for generating an electrical signal representative of the information in response to the light reflected from the disc along said second path.

18. A recorder-playback machine as set forth in claim 16, including means along said second path for allowing passage of any portion of said second light beam reflected from the disc along said second path, and for blocking passage of any portion of said first light beam reflected from the disc along said second path.

19. A recorder-playback machine as set forth in claim 16, wherein said focusing subassembly further includes means for detecting the focus of said second light beam upon the disc.

20. A recorder-playback machine for recording and/or playing back information from an information storage disc, comprising:

a machine base;

a "write" laser secured to said machine base, said "write" laser operative to generate a first light beam directed along a first path for use in recording information upon the disc;

means for supporting the disc for rotation relative to said machine base;

an optics carriage assembly movably mounted with respect to said machine base, said carriage assembly including an optical record-playback head, a "read" laser for generating a second light beam directed along a second path in fixed optical alignment with said head for use in playing back information from the disc, and means in optical alignment with said first path for reflecting said first light beam to said head, said reflecting means including a dichroic mirror, said carriage assembly further including a reflection mirror adjacent said dichroic mirror for reflecting said second light beam through said dichroic mirror to said head, said dichroic mirror being mounted to allow passage of said second light beam; and means for moving said carriage assembly with respect to said machine base and to the disc and generally in parallel with a portion of said first path to maintain said reflecting means in optical alignment with said first light beam regardless of the position of said carriage assembly.

21. A recorder-playback machine as set forth in claim 20, including modulator means mounted on said machine base along said first path for interrupting said first light beam to allow passage of a modulated light beam representative of the information.

22. A recorder-playback machine as set forth in claim 21, wherein said carriage assembly further includes a focusing subassembly having a first lens along said first path for conditioning said first light beam for passage through said head, and a second lens along said second path for conditioning said second light beam for passage through said head.

23. A recorder-playback machine as set forth in claim 22, wherein said focusing subassembly further includes means along said second path for passing said second light beam in a direction toward the disc, and for reflecting in a generally lateral direction light reflected from the disc along said second path in a direction away from the disc.

24. A recorder-playback machine as set forth in claim 23, wherein said focusing subassembly further includes light sensitive means for generating an electrical signal representative of the information in response to the light reflected from the disc along said second path.

25. A recorder-playback machine as set forth in claim 24, wherein said modulator means comprises means for splitting said first light beam into said modulated light beam for passage along said first path, and an auxiliary light beam comprising the complement of said modulated light beam and directed along a third path, and including light responsive means along said third path for generating an electrical signal in response to said auxiliary light beam for use in monitoring the characteristics of said modulated light beam.

26. A recorder-playback machine as set forth in claim 25, including comparator means for comparing tby said light responsive means along said second path.

27. A recorder-playback machine as set forth in claim 23, wherein said focusing subassembly further includes means along said second path for allowing passage of any portion of said second light beam reflected from the disc along said second path, and for blocking passage of any portion of said first light beam reflected from the disc along said second path.

28. A recorder-playback machine as set forth in claim 20, wherein said means for moving said carriage assembly comprises track means for mounting said carriage assembly with respect to said machine base for movement generally along a linear path, and drive means for controllably positioning said carriage assembly along said track means.

29. A recorder-playback machine as set forth in claim 20, wherein said "read" laser is mounted for generating and directing said second light beam along a portion of said second path substantially in parallel with said portion of said first path.

30. A recorder-playback machine for recording and/or playing back information from an information storage disc, comprising:

a machine base;

a "write" laser secured to said machine base, said "write" laser operative to generate a first light beam directed along a first path for use in recording information upon the disc;

a modulator subassembly mounted on said machine base and including modulator means along said first path for interrupting said first light beam to allow passage along said first path of a modulated light beam representative of the information to be recorded;

means for supporting the disc for rotating relative to said machine base;

an optics carriage;

track means for movably mounting said optics carriage with respect to said machine base for movement along a path generally in parallel with a portion of said first path and generally along a radius of the disc when the disc is supported by said support means;

drive means for controllably positioning said carriage along said track means;

first reflecting means on said carriage in optical alignment with said modulated light beam for reflecting said modulated light beam toward the disc regardless of the position of said carriage;

an optical record-playback head mounted on said carriage in association with said first reflecting means for passage of said modulated light beam and to focus said modulated light beam on the disc;

a "read" laser mounted on said carriage for generating a second light beam along a second path for use in playing back information from the disc;

second reflecting means on said carriage in optical alignment with said second light beam for reflecting said second light beam through said head toward the disc for focusing of said second light beam by said head on the disc at a point slightly downstream of the point of focus of said modulated light beam; and means responsive to any portion of said second light beam reflected from the disc along said second path for generating an electrical signal representative of the video information;

said modulator subassembly further including a first condensing lens for focusing said first light beam for passage through said modulator means, and a second condensing lens for directing said modulated light beam along a length of said first path to said carriage, said first path length including said first path portion.

31. A recorder-playback machine as set forth in claim 30, including a first mirror mount assembly for redirecting said first light beam to said modulator means, and a second mirror mount assembly for redirecting said modulated light beam from said modulator means along said first path.

32. A recorder-playback machine as set forth in claim 30, including a focusing subassembly mounted on said carriage for movement therewith, said subassembly including a first lens along said first path for conditioning said modulated light beam for passage through said head, and a second lens along said second path for conditioning said second light beam for passage through said head.

33. A recorder-playback machine as set forth in claim 32, wherein said focusing subassembly further includes means along said second path for passing said second light beam in a direction toward the disc, and for reflecting in a generally lateral direction light reflected from the disc along said second path in a direction away from the disc.

34. A recorder-playback machine as set forth in claim 33, wherein said focusing subassembly further includes means along said second path for allowing passage of any portion of said second light beam reflected from the disc along said second path, and for blocking passage of any portion of said modulated light beam reflected from the disc along said second path.

35. A recorder-playback machine as set forth in claim 30, wherein said modulator subassembly further includes means for splitting said first light beam into said modulated light beam for passage along said first path, and an auxiliary light beam comprising the complement of said modulated light beam and directed along a third path, and including light responsive means along said third path for generating an electrical signal in response to said auxiliary light beam for use in monitoring the characteristics of said modulated light beam.

36. A recorder-playback machine as set forth in claim 35, including comparator means for comparing the electrical signal generated by said light responsive means along said third path with the electrical signal generated by said light responsive means along said second path.

37. A recorder-playback machine for recording and/or playing back information from an information storage disc, comprising:
a machine base;
a "write" laser secured to said machine base, said "write" laser operative to generate a first light beam directed along a first path for use in recording information upon the disc;
means for supporting the disc for rotation relative to said machine base;
an optics carriage movably mounted with respect to said machine base;
an optical record-playback head mounted on said carriage for movement therewith;
a "read" laser mounted with respect to said head, for generating a second light beam directed along a second path for passage of said second light beam through said head and for focusing thereof by said head upon the disc for use in playing back information from the disc;
means for moving said carriage with respect to said machine base and said disc generally in parallel with a portion of said first path;
modulator means mounted on said machine base along said first path for interrupting said first light beam to produce a modulated light beam representative of the information to be recorded;
a first condensing lens for focusing said first light beam for passage through said modulator means, and a second condensing lens for directing said modulated light beam along a length of said first path to said carriage, said first path length including said first path portion; and
means on said carriage in optical alignment with said first light beam for reflecting said first light beam through said head regardless of the position of said carriage for focusing of said first light beam by said head upon the disc.

38. A recorder-playback machine as set forth in claim 37, wherein said modulator means comprises an acoustooptic modulator.

39. A recorder-playback machine as set forth in claim 37, wherein said first and second condensing lenses and said modulator means are mounted in fixed relation to each other on a subassembly plate, and wherein said subassembly plate is mounted in a fixed position with respect to said "write" laser upon said machine base.

40. A recorder-playback machine as set forth in claim 37, including a first mirror mount assembly for redirecting said first light beam to said modulator means, and a second mirror mount assembly for redirecting said modulated light beam from said modulator means along said first path.

41. A recorder-playback machine as set forth in claim 40, wherein said first and second mirror mount assemblies are mounted on said machine base in fixed relation thereto.

42. A recorder-playback machine as set forth in claim 37, wherein said modulator means comprises means for splitting said first light beam into said modulated light beam for passage along said first path, and an auxiliary light beam comprising the complement of said modulated light beam and directed along a third path, and including light responsive means along said third path for generating an electrical signal in response to said auxiliary light beam for use in monitoring the characteristics of said modulated light beam.

43. A recorder-playback machine as set forth in claim 42, including means along said second path for responding to any portion of said second light beam reflected from the disc along said second path for generating an electrical signal in response to said reflected portion for use in playing back the information from the disc.

44. A recorder-playback machine as set forth in claim 43, including comparator means for comparing the electrical signal generated by said light responsive means along said third path with the electrical signal generated by said light responsive means along said second path.

45. A recorder machine for recording information onto an information storage disc, comprising:
a machine base;
a "write" laser secured to said machine base, said "write" laser operative to generate a collimated light beam directed along a path for use in recording information upon the disc;
means for supporting the disc for rotation relative to said machine base;
an optics carriage movably mounted with respect to said machine base;
an optical record head mounted on said carriage for movement therewith;
means for moving said carriage with respect to said machine base and said disc, generally in parallel with a portion of said path and radially of said disc;
modulator means mounted on said machine base along said path for interrupting said light beam to produce a modulated light beam representative of the information;
a first condensing lens positioned upstream of said modulator means for focusing said collimated light beam for passage through said modulator means;
a second condensing lens positioned downstream of said modulator means for conditioning said modulated light beam leaving said modulator means for passage along said path to said carriage; and
a third condensing lens on said carriage for receiving said conditioned beam from said second condensing lens and for directing said beam along said path through said record head for focusing on the disc;

said record head including means in optical alignment with said beam from said third condensing lens for focusing said beam upon the disc;

said second condensing lens acting upon said light beam from said modulator means for conditioning said modulated beam to remain in focus on said disc regardless of the position of said carriage with respect to said machine base.

46. The recorder machine as claimed in claim 45, wherein:

said modulator means includes means for splitting the light beam issuing therefrom into said modulated light beam for passage along said path, and an auxiliary modulated light beam comprising the complement of said modulated light beam and directed along a second path; and wherein said recorder machine further includes light responsive means along said second path for generating an electrical signal in response to said auxiliary light beam for use in monitoring the characteristics of said modulated light beam.

47. The recorder machine as claimed in claim 46, including means for analyzing the electrical signal generated by said light responsive means along said second path.

48. The recorder machine as claimed in claim 45, wherein said modulator means is an acousto-optical modulator.

* * * * *